(12) United States Patent
Okamura

(10) Patent No.: US 7,929,046 B2
(45) Date of Patent: Apr. 19, 2011

(54) IMAGE-PICKUP APPARATUS, LENS APPARATUS AND IMAGE-PICKUP SYSTEM HAVING COMBINATION IDENTIFICATION FUNCTION

(75) Inventor: Satoshi Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 904 days.

(21) Appl. No.: 11/671,741

(22) Filed: Feb. 6, 2007

(65) Prior Publication Data
US 2007/0189730 A1    Aug. 16, 2007

(30) Foreign Application Priority Data

Feb. 8, 2006  (JP) ................... 2006-030655
Feb. 6, 2007  (JP) ................... 2007-026214

(51) Int. Cl.
*H04N 5/225* (2006.01)

(52) U.S. Cl. ...................... 348/360; 348/340

(58) Field of Classification Search .................. 348/360, 348/335, 340
See application file for complete search history.

(56) References Cited

U.S. PATENT DOCUMENTS

| | | | | |
|---|---|---|---|---|
| 5,434,637 | A * | 7/1995 | Ohta ............................. | 396/529 |
| 6,738,574 | B2 * | 5/2004 | Nishida et al. .................. | 396/87 |
| 7,593,055 | B2 * | 9/2009 | Nakamura et al. ............. | 348/360 |
| 2001/0030813 | A1 * | 10/2001 | Kaneko et al. ................ | 359/697 |
| 2005/0099699 | A1 * | 5/2005 | Nurishi ......................... | 359/676 |
| 2005/0128342 | A1 * | 6/2005 | Izukawa ....................... | 348/360 |
| 2005/0140815 | A1 | 6/2005 | Nakano et al. | |

FOREIGN PATENT DOCUMENTS

| | | |
|---|---|---|
| CN | 1437118 A | 8/2003 |
| CN | 1637456 A | 7/2005 |
| JP | 10-020181 | 1/1998 |
| JP | 11-127376 | 5/1999 |
| JP | 2003-287664 | 10/2003 |

OTHER PUBLICATIONS

Notification of First Office Action, Chinese application No. 2007100028505, dated Mar. 28, 2008.

* cited by examiner

*Primary Examiner* — Nicholas G Giles
(74) *Attorney, Agent, or Firm* — Canon U.S.A., Inc. I.P. Division

(57) ABSTRACT

An image-pickup system is disclosed which is capable of performing highly accurate back focus adjustment for each combination of an image-pickup apparatus and a lens apparatus. The system includes a first memory provided in the image-pickup apparatus and stores first identification information unique to a combination of the image-pickup apparatus and a certain lens apparatus, a second memory provided in the lens apparatus and stores second identification information unique to a combination of the lens apparatus and a certain image-pickup apparatus. A comparator compares the first identification information with the second identification information. The generator generates, when the comparison results that the first identification information does not match the second identification information, identification information unique to the combination of the image-pickup apparatus and the lens apparatus. The controller causes the first memory and the second memory to store the identification information generated by the generator.

8 Claims, 4 Drawing Sheets

IMAGE-PICKUP APPARATUS, LENS APPARATUS AND IMAGE-PICKUP SYSTEM HAVING COMBINATION IDENTIFICATION FUNCTION

BACKGROUND OF THE INVENTION

1. Field of the Invention

The present invention relates to an image-pickup apparatus on which an interchangeable lens can be mounted and an image-pickup system constituted thereby.

2. Description of the Related Art

In recent years, there is an increasing demand for the enhancement of performance of an image-pickup apparatus, such as a digital still camera and a digital video camera. In a lens interchangeable type image-pickup apparatus, a distance (back focus) from a lens closest to the image side to an image-pickup element, such as a CCD sensor, is different for each lens apparatus mounted on the image-pickup apparatus. For this reason, it is necessary to adjust the back focus for every different lens apparatus mounted on the image-pickup apparatus.

Thus, techniques for automatically adjusting the back focus are disclosed in Japanese Patent Laid-Open No. 2003-287664 and Japanese Patent Laid-Open No. 11-127376. In these techniques, data for adjusting the back focus is stored in the image-pickup apparatus. Therefore, if the back focus is once adjusted, the adjustment data is sent from the image-pickup apparatus to a lens apparatus when the lens apparatus is mounted, so as to enable the lens apparatus to correct the back focus on the basis of the adjustment data.

However, adjustment data corresponding to a lens apparatus which is mounted on the image-pickup apparatus for the first time, is not necessarily always stored in the image-pickup apparatus. Further, since the adjustment data are different for each combination of the lens apparatus and the image-pickup apparatus, it is preferred that the adjustment data are managed so as to be associated with identification data which enable the lens apparatuses and the image-pickup apparatuses to be identified, respectively.

In Japanese Patent Laid-Open No. 10-20181, there is disclosed an image-pickup apparatus into which the adjustment data and the identification data can be input by the user.

However, in the image-pickup apparatus disclosed in Japanese Patent Laid-Open No. 10-20181, it is difficult to perform accurate back focus adjustment. This is because in the image-pickup apparatus disclosed in Japanese Patent Laid-Open No. 10-20181, the same identification data is allocated for a plurality of lens apparatuses of the same type, and hence, the same back focus adjustment data is used for the plurality of lens apparatuses. Even for lens apparatuses of the same type, optimal back focus adjustment data for the respective lens apparatuses are different from each other due to the manufacturing error. Therefore, it is difficult to perform highly accurate back focus adjustment by using the same back focus adjustment data.

Further, in the image-pickup apparatus disclosed in Japanese Patent Laid-Open No. 10-20181, although the identification data and the adjustment data can be input by the user, the back focus adjustment performed by the user is inaccurate in many cases, and further, the usability of the image-pickup apparatus is deteriorated due to the time and labor for inputting these data in each adjustment.

BRIEF SUMMARY OF THE INVENTION

The present invention provides an image-pickup apparatus, lens apparatus, and an image-pickup system, which are capable of performing highly accurate back focus adjustment for each combination of the lens apparatus and the image-pickup apparatus.

According to an aspect, the present invention provides an image-pickup system which includes an image-pickup apparatus and a lens apparatus that is removably mounted on the image-pickup apparatus. The system includes a first memory which is provided in the image-pickup apparatus and stores first identification information unique to a combination of the image-pickup apparatus and a certain lens apparatus, a second memory which is provided in the lens apparatus and stores second identification information unique to a combination of the lens apparatus and a certain image-pickup apparatus, a comparator, a generator, and a controller, which are provided in one of the image-pickup apparatus and the lens apparatus. The comparator compares the first identification information stored in the first memory with the second identification information stored in the second memory. The generator generates, when the comparison by the comparator results that the first identification information does not match the second identification information, identification information unique to the combination of the image-pickup apparatus and the lens apparatus. The controller causes the first memory and the second memory to store the identification information generated by the generator as the first identification information and the second identification information, respectively.

According to another aspect, the present invention provides an image-pickup apparatus on which a lens apparatus is removably mounted. The apparatus includes a memory which stores first identification information unique to a combination of the image-pickup apparatus and a certain lens apparatus, a comparator which compares the first identification information with second identification information obtained from the lens apparatus mounted on the image-pickup apparatus, the second identification information being unique to the combination of the lens apparatus and a certain image-pickup apparatus, a generator which generates, when the comparison by the comparator results that the first identification information does not match the second identification information, identification information unique to the combination of the image-pickup apparatus and the lens apparatus, and a controller which causes the first memory to store the identification information generated by the generator as the first identification information and outputs the generated identification information as the second identification information to the lens apparatus.

According to still another aspect, the present invention provides a lens apparatus which is removably mounted on an image-pickup apparatus including a first memory that stores first identification information unique to a combination of the image-pickup apparatus and a certain lens apparatus. The apparatus includes a second memory which stores second identification information unique to a combination of the lens apparatus and a certain image-pickup apparatus, a comparator which compares the second identification information stored in the second memory with the first identification information stored in the first memory, a generator which generates, when the comparison by the comparator results that the second identification information does not match the first identification information, identification information unique to the combination of the lens apparatus and the image-pickup apparatus, and a controller which causes the second memory to store the identification information generated by the generator as the second identification information and outputs the generated identification information as the first identification information to the image-pickup apparatus.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the accompanying drawings.

In the following, an image-pickup system according to an embodiment of the present invention will be described with reference to the accompanying drawings.

Figure 1:
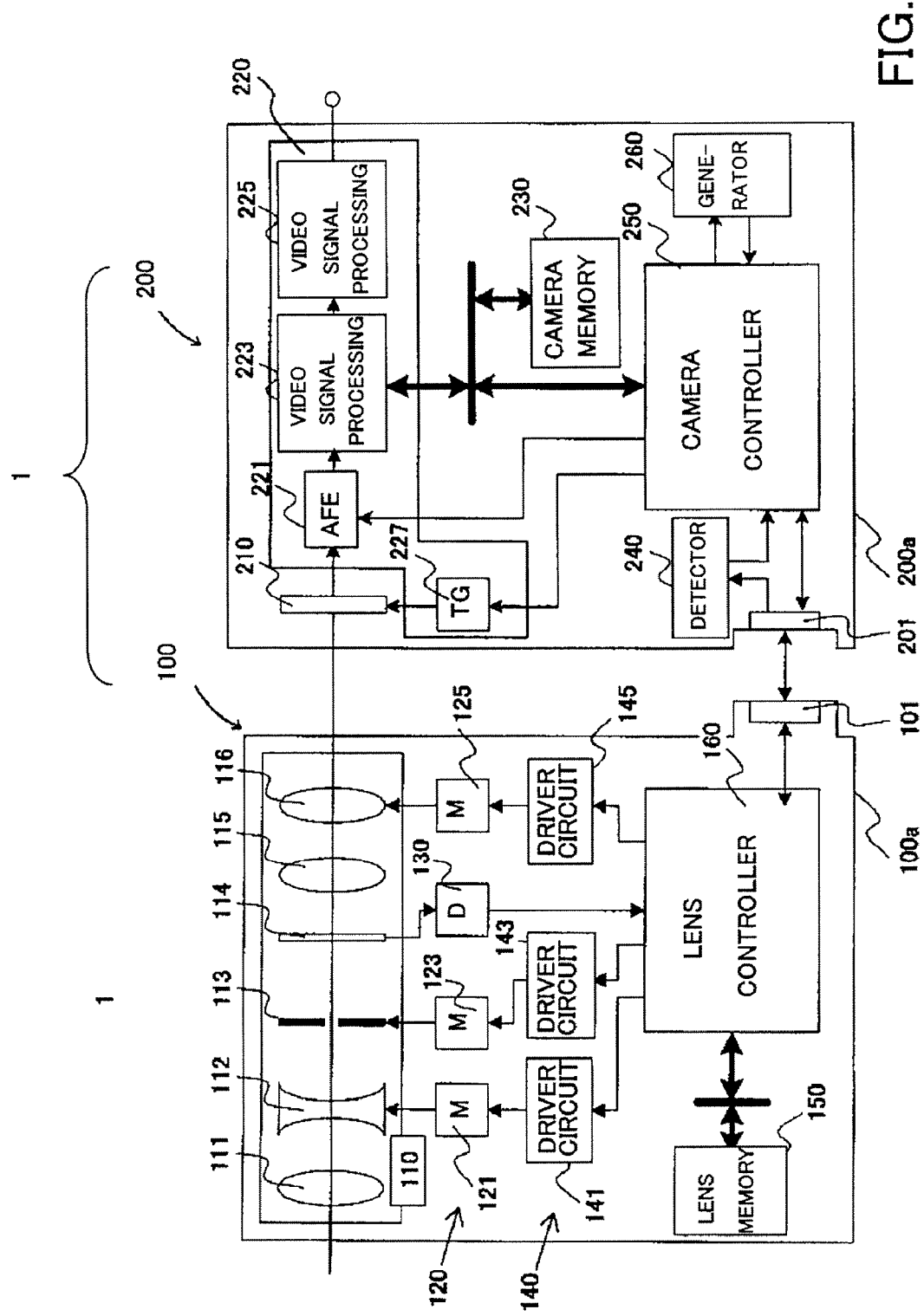
FIG. 1 is a block diagram showing a configuration of a camera according to the present invention.

FIG. 1 is a block diagram showing a configuration of an image-pickup system 1 according to the present invention.

The image-pickup system 1 is constituted by a camera (image-pickup apparatus) 200, such as a video camera, having a function to pickup an image of an object, and a lens apparatus 100 which is attachable to and detachable from the camera 200.

The lens apparatus 100 has an image-pickup optical system 110 which includes a plurality of lenses. The lens apparatus 100 has a case 100a which accommodates the image-pickup optical system 110 and each portion described below.

The lens apparatus 100 has a lens side contact 101, and the lens side contact 101 is brought into contact with a camera side contact 201 as will be described below, when the lens apparatus 100 is mounted on the camera 200. The lens side contact 101 has a communication terminal (not shown) and a power supply terminal (not shown), which are electrical terminals. In this case, the lens side contact 101 is used for the signal transmission of controllers 160 and 250 as will be described below, via a communication terminal of the camera side contact. Further, the lens side contact 101 is also used for supplying power from the camera 200 to the lens apparatus 100 via a power supply terminal (not shown).

In the lens apparatus 100, the image-pickup optical system 110 guides light from the object to an image-pickup element 210, described below. The image-pickup optical system 110 includes a first fixed lens 111, a magnification varying lens 112, a diaphragm 113, an ND filter 114, a second fixed lens 115, and a focus lens 116 in order from the side of the object.

The magnification varying lens 112 performs magnification varying of the image-pickup optical system 110 by moving in the optical axis direction.

The diaphragm 113 adjusts the amount of entering light by changing its aperture diameter.

The ND filter 114 is provided in such a manner that it can be inserted into and taken out of the optical path of the image-pickup optical system 110, and reduces the amount of light entering the image-pickup element 210 by being inserted into the optical path. The ND filter 114 is inserted into and taken out of the optical path in response to an operation of a key switch (not shown) provided for the lens apparatus 100.

The focus lens 116 is moved in the optical axis direction to correct image plane variation associated with the magnification varying, and to perform focus adjustment.

The variable magnification lens 112, the diaphragm 113, and the focus lens 116 are driven by a first motor 121, a second motor 123, and a third motor 125 which constitute a driving section 120.

The first motor 121 drives the magnification varying lens 112 on the basis of a drive signal output from a first driver circuit 141.

The second motor 123 drives the diaphragm 113 to change the opening diameter of the diaphragm 113 on the basis of a drive signal output from a second driver circuit 143.

The third motor 125 drives the focus lens 116 on the basis of a drive signal output from a third driver circuit 145.

A detector 130 detects insertion and ejection of the ND filter 114, and outputs detection information to the controller 160.

A driver circuit section 140 includes the above described first driver circuit 141, second driver circuit 143 and third driver circuit 145.

The first driver circuit 141 converts a control signal input from the lens controller 160 constituted by a CPU or the like, into a drive signal, and outputs the drive signal to the first motor 121.

The second driver circuit 143 converts a control signal input from the lens controller 160 into a drive signal, and outputs the drive signal to the second motor 123.

The third driver circuit 145 converts a control signal input from the lens controller 160 into a drive signal, and outputs the drive signal to the third motor 125.

A lens memory 150 incorporated in the lens apparatus 100 stores various parameters for the magnification varying control and the focus control in the lens apparatus 100 and identification data, described below. The lens memory 150 is constituted by a nonvolatile flash memory in the present embodiment. The identification data stored in the lens memory 150 include identification data stored in the course of the manufacturing process and also identification data which is generated in a generator 260 provided in the camera 200 and sent from the camera 200.

The lens controller 160 generates control signals for a magnification varying operation and a focusing operation on the basis of data indicating a zoom direction (or a zoom direction data which indicates the telephoto direction or the wide-angle direction), magnification varying speed data, and a focus evaluation value, described below, which are obtained by the communication with the camera 200. Then, the lens controller 160 outputs the control signal to the first driver circuit 141 and the third driver circuit 145.

Further, the lens controller 160 generates an exposure control signal which is a control signal of the diaphragm 113 from an exposure evaluation value obtained by the communication with the camera 200, and outputs the exposure control signal to the second driver circuit 143. Further, the lens controller 160 sends information from the detector 130 to the camera 200, so as to enables the insertion/ejection state of the ND filter 114 to be detected in the camera side.

The camera 200 picks up an object image formed by the image-pickup optical system 110 in the lens apparatus 100. The following components of the camera 200 are accommodated in a case 200a. In addition, the camera 200 has the above described camera side contact 201.

The image-pickup element 210 performs photoelectrical conversion of the object image. The image-pickup element 210 is constituted by a CCD sensor, a CMOS sensor, and the like. The image-pickup element 210 is electrically connected to an analog front end circuit 221 and a timing generator 227.

A processing section 220 calculates (or generates) a back focus adjustment data (or back focus correction information) as correction data for correcting the back focus which is a distance from a position of the focus lens 116 of the lens apparatus 100 (more particularly, the image plane side top of the focus lens 116) to a focal position of the image-pickup optical system 110. The processing section 220 has the analog front end circuit 221, a camera signal processing circuit 223, and a video signal processing circuit 225.

The analog front end circuit (AFE) 221 performs respective kinds of processing of sampling, gain control, and A/D conversion on an output signal from the image-pickup element 210.

The camera signal processing circuit 223 converts a digital signal output from the analog front end circuit 221 into a video signal. Further, the camera signal processing circuit 223 generates an exposure evaluation value signal necessary for exposure control, a color difference evaluation value signal necessary for white balance control, and a focus evaluation value signal necessary for focus control. The focus evaluation value signal is used for a so-called auto focus control of a contrast detection method. Further, the camera signal processing circuit 223 performs set value control relating to image quality such as white balance, color balance, and gamma, in accordance with a request from the camera controller 250.

The video signal processing circuit 225 converts a video signal output from the camera signal processing circuit 223 into a video signal of a predetermined format, and outputs the converted video signal to the outside. Further, the video signal from the video signal processing circuit 225 is sent to a display device (not shown), so as to be displayed as an object video image.

The timing generator 227 generates a signal at timing for reading a signal from the image-pickup element 210. The timing generator 227 is controlled by the camera controller 250.

A detector 240 detects that the lens apparatus 100 is mounted on the camera 200, and outputs the detection information to the camera controller 250.

The camera controller 250 is capable of acquiring respective evaluation values of exposure, color difference and focus, which are generated by the camera signal processing circuit 223, and of reading respective kinds of parameters stored in a camera memory 230. Further, the camera controller 250 reads the state of various key switches (not shown) of the camera, and switches control contents in accordance with the reading result. The camera controller 250 corresponds to a controller and a comparator.

The camera memory 230 is constituted by a nonvolatile memory. The camera memory 230 stores identification data for identifying the combinations of the camera 200 and certain lens apparatuses (that is, identification data which is unique for each combination). Further, the camera memory 230 stores various parameters for controlling exposure, white balance, and image quality, and back focus adjustment data, and control data for controlling the lens apparatus 100.

The back focus adjustment data stored in the camera memory 230 are obtained from the result of adjusting the back focus for each combination of a lens apparatus and the camera 200. In this way, the camera memory 230 stores the identification data for identifying the combinations of the camera 200 and certain lens apparatuses and the back focus adjustment data corresponding to the respective combinations, which are associated with each other.

Figure 2:
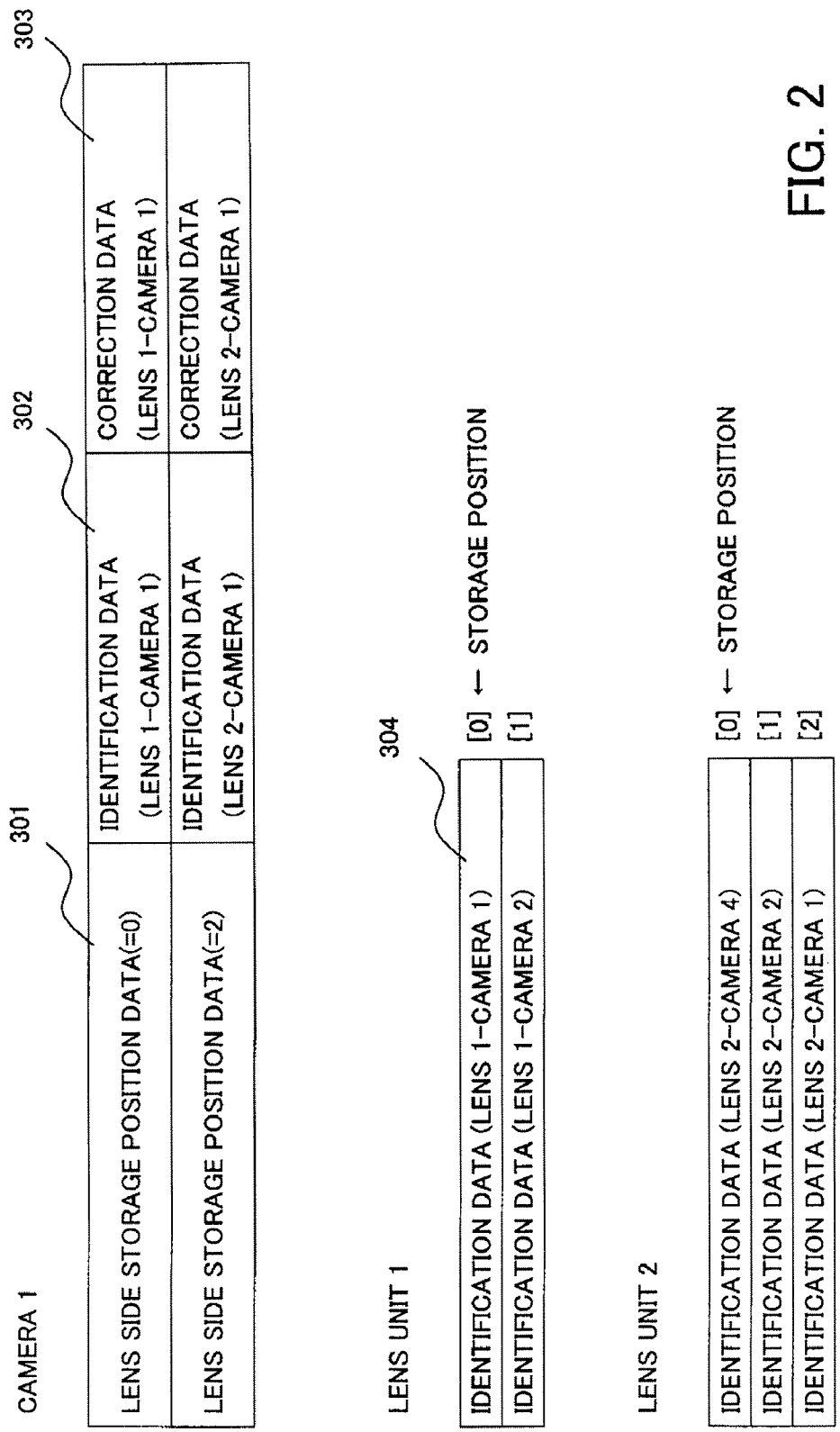
FIG. 2 is a figure showing a structure of data including identification data stored in the memory shown in FIG. 1.

FIG. 2 is a figure showing a data structure of identification/adjustment data stored in the lens memory 150 and the camera memory 230.

Reference numeral 302 denotes camera side identification data (first identification information) which represent respective combinations of certain lens apparatuses (LENS 1 and LENS 2) and the camera 200 (CAMERA 1), and are stored in the camera memory 230. Reference numeral 303 denotes back focus adjustment data obtained as results of performing the back focus adjustment to the respective combinations of the certain lens apparatuses and the camera 200. The identification data and correction data whose number corresponds to the number of the combinations of the lens apparatuses and the camera 200 are stored.

The back focus is a distance from the image plane side top of the focus lens closest to the image plane in the lens apparatus or from a mounting reference surface of the focus lens to the focal position of the lens apparatus. The back focus adjustment data is data for correcting the back focus in accordance with the combination of the camera and the lens apparatus.

Reference numeral 301 denotes storage position data which respectively represent the position (address) in the lens memory 150 where the data matching the identification data 302 among a plurality of lens side identification data stored therein is stored. The storage position data 301, which will be described in detail below, is data prepared in order to reduce the number of times of comparison of the identification data. Reference numeral 304 denotes lens side identification data (second identification information) stored in the lens apparatus 100 (the lens memory 150), and are data having the same structure as that of the camera side identification data 302 stored in the camera memory 230.

The camera controller 250 compares the lens side identification data which is stored in the lens memory 150 and obtained by communication with the lens apparatus 100, with the camera side identification data stored in the camera memory 230, and determines whether or not the obtained identification data is effective (that is, whether or not the lens side identification data matches the camera side identification data). When the identification data is effective, the back focus adjustment data stored in the camera memory 230 and associated with the effective (or matched) identification data is sent to the lens apparatus 100.

On the contrary, when there is no effective identification data (that is, the lens side identification data does not match the camera side identification data), the camera controller 250 determines that a new lens apparatus is combined with the camera 200, and requires the generator 260 to generate a random number. The generator 260 generates a random number of a predetermined number of bits, and outputs the random number as the lens side identification data and the camera side identification data to the camera controller 250. The camera controller 250 causes the lens and camera memories 150 and 230 to store the lens side identification data and the camera side identification data, respectively.

Further, the camera controller 250 generates control data necessary for lens control and camera control, and outputs the generated data. As for the lens control, the camera controller 250, according to an operating state of the zoom key, generates the zoom direction data and magnification varying speed data corresponding to the amount of operation thereof, and obtains a focus evaluation value from the camera signal processing circuit 223. The camera controller 250 sends the obtained data to the lens apparatus 100.

Note that in the present embodiment, the generator 260 is incorporated in the camera 200, but the generator may be incorporated in the lens apparatus 100. In this case, the lens controller 160 compares the lens side identification data stored in the lens memory 150 with the camera side identification data received from the camera 200. When the lens apparatus 100 is combined with a new camera, the generator generates identification data for identifying the new combination. Then, the lens controller 160 stores the generated identification data in the lens memory as the lens side identification data and sends the generated identification data to the camera as the camera side identification data to store it in the camera memory.

In addition, the lens memory 150 stores the back focus adjustment data associated with the lens side identification data. When the lens side identification data matches the camera side identification data received from the camera 200, the lens controller 160 performs a back focus adjustment operation on the basis of the back focus adjustment data corresponding to the matched lens side identification data.

Thereby, the back focus adjustment data different for each combination of the lens apparatus 100 and the camera can be used.

Further, the result obtained by associating the lens apparatus 100 with the camera 200 can be used for purposes other than the back focus adjustment. For example, the result can be used for correction of spectral characteristics and aberration such as chromatic aberration, and control of each apparatus for the noise of the lens apparatus which is used, and the like.

In the following, an operation when the lens apparatus 100 is mounted on the camera 200 will be explained.

First, when the lens apparatus 100 is mounted, the detector 240 outputs detection information to the camera controller 250. The camera controller 250 starts supplying power to the lens apparatus 100 via the contacts 101 and 201, when confirming the detection from the detection information. Subsequently, the lens controller 160 periodically communicates with the camera controller 250. The contents of communication are divided into initialization communication and normal communication.

In the initialization communication, type data for discriminating the type of the lens apparatus 100, function data indicating the function of the lens apparatus 100, identification data for identifying the combination of the lens apparatus 100 and the camera 200, and back focus adjustment data are communicated. Further, in the normal communication, various data including the focus evaluation value, for controlling the image-pickup optical system 110 of the lens apparatus 100 are communicated.

Figure 3:
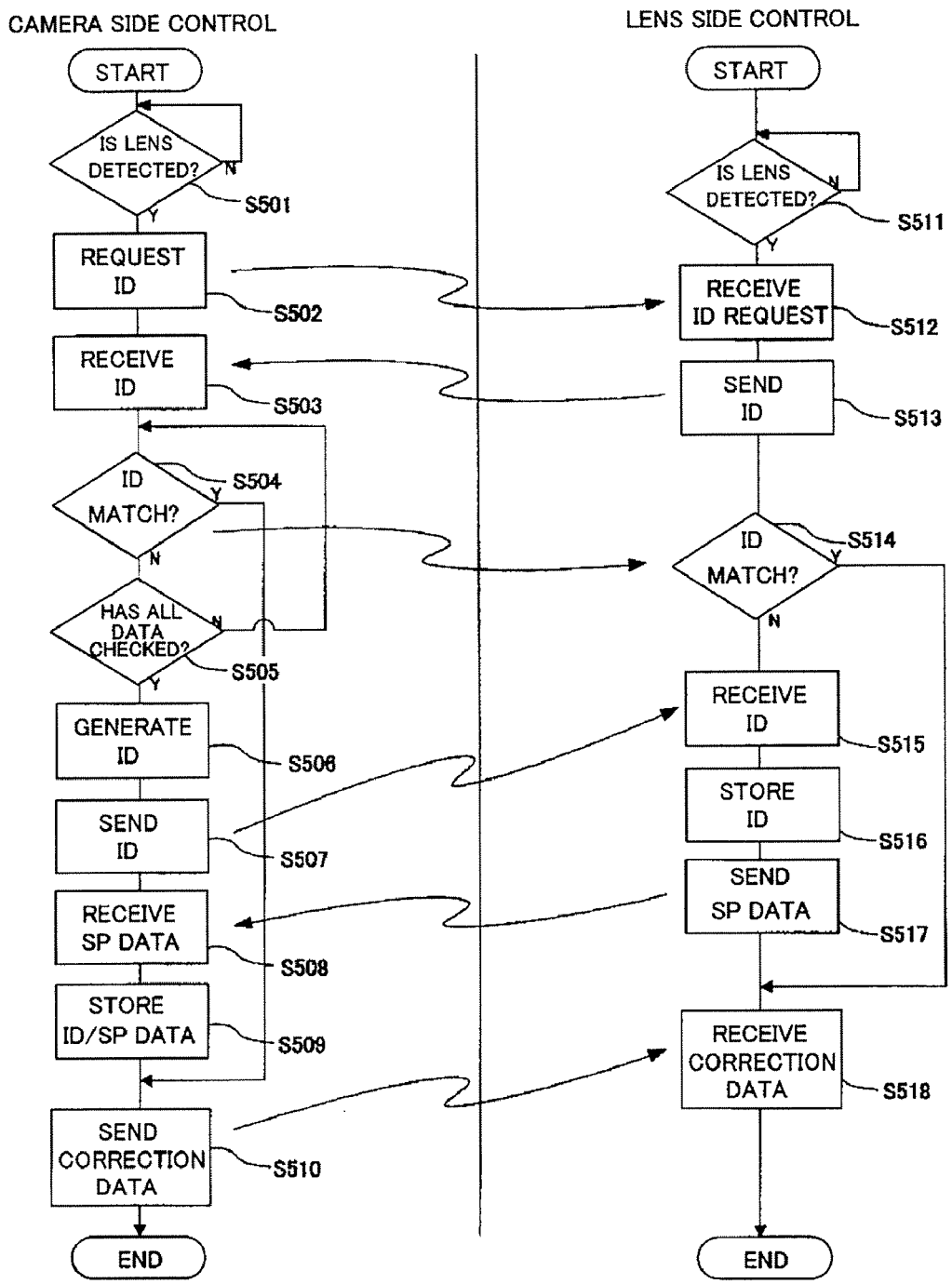
FIG. 3 is a flow chart showing an initial operation at the time of connection.

In the following, there will be described an initial operation 500 for exchanging data, such as the back focus adjustment data, when the lens apparatus 100 is connected with the camera 200. Here, FIG. 3 is a flow chart showing the initial operation 500 when the lens apparatus 100 is connected with the camera 200.

The camera controller 250 detects the presence or absence of mounting of the lens apparatus on the basis of information from the detector 240 (step S501). When no lens is mounted, the camera controller 250 waits until a lens is mounted. When detecting the mounting of a lens, the camera controller 250 proceeds to step S502.

Then, the camera controller 250 performs identification data requesting communication to the lens controller 160 (step S502). The identification data requesting communication is communication which requires the lens controller 160 to send all the identification data (the identification data is abbreviated as ID in the figure) stored in the lens memory 150 to the camera side. When the communication is completed, the camera controller 250 proceeds to step S503.

Next, the camera controller 250 receives all the identification data sent from the lens controller 160 (step S503), and proceeds to step S504.

On the other hand, the lens controller 160 determines whether or not communication with the camera is enabled (step S511). When the communication is not enabled, the lens controller 160 waits until the communication is enabled. When the communication is enabled, the lens controller 160 proceeds to step S512. Then, the lens controller 160 receives the identification data requesting communication from the camera controller 250 (step S512), and proceeds to step S513. Subsequently, the lens controller 160 sends all the identification data stored in the lens memory 150 to the camera side (step S513), and proceeds to step S514.

In step S504, the camera controller 250 determines whether or not identification data matching the identification data received from the lens apparatus 100 is stored in the camera memory 230 (or whether or not the received identification data is effective). That is, in step S504, the camera controller 250 compares the identification data 302 stored in the camera memory 230 with the identification data 304 stored in the lens memory 150. The comparison result is sent to the lens apparatus 100. When the identification data 304 matches the identification data 302, the camera controller 250 determines that the camera 200 was combined with the lens apparatus 100 before, and proceeds to step S510. On the other hand, when the identification data 304 is different from the identification data 302, the camera controller 250 proceeds to step S505.

Then, the camera controller 250 determines whether or not the comparison between all the identification data stored in the camera memory 230 and the identification data stored in the lens memory 150 is completed (step S505). When the comparison is not completed, the camera controller 250 returns to step S504. When the comparison is completed, the camera controller 250 determines that the mounted lens apparatus 100 and the camera 200 are newly combined, and proceeds to step S506.

Here, in the case where the camera controller 250 performs processing for determining whether or not the comparison and determination of the identification data in steps S504 and S505 are completed, if the comparison is performed for all combinations of the camera side identification data and the lens side identification data which are acquired in step S503, the number of times of comparison is significantly increased depending on the number of the identification data. For example, when ten identification data are provided for the camera side, and ten identification data are also provided for the lens apparatus side, it is necessary to perform the comparison 10×10=100 times.

Thus, the order number of the position in the lens memory 150 at which the lens side identification data corresponding to the camera side identification data is stored, is stored as the storage position data 301 in the camera memory 230. The identification data stored at the position corresponding to the storage position data 301 among the lens side identification data acquired in step S503 is compared with the camera side identification data. The lens side identification data corresponding to one camera side identification data is determined, and hence, in the case of the above described example, only ten camera side identification data need to be compared with the lens side identification data stored at the storage positions corresponding to the respective camera side identification data. Thus, it is only necessary to perform the comparison 10×1=10 times.

On the other hand, the lens controller 160 receives the comparison result of the identification data from the camera controller 250 in step S514. When the comparison result indicates a match of the identification data, the lens controller 160 proceeds to step S518, and when the comparison result indicates a non-match of the identification data, the lens controller 160 proceeds to step S515.

In step S506, the camera controller 250 determines that the combination of the lens apparatus 100 and the camera 200 is new from the result in step S505, and causes the generator 260 to newly generate identification data (third identification information) which is unique to the combination. In accordance with the instruction of the camera controller 250, the generator 260 generates a random number of a predetermined number of bits, and outputs the random number to the camera controller 250. The camera controller 250 uses this random number as new identification data.

In the case where the number of bits is 48, it is possible to generate identification data for two to the power of 48 combinations of the lens apparatus and the camera. Therefore, a possibility that the generated identification data overlaps with the existing identification data is extremely low, and hence, it is possible to regard the generated identification data as information unique to the combination of the lens apparatus and the camera. When the generation of the identification data is completed, the camera controller 250 proceeds to step S507.

In step S507, the camera controller 250 sends the new identification data generated in step S506 to the lens apparatus side, and proceeds to step S508.

On the other hand, the lens controller 160 receives the identification data sent from the camera controller 250 (step S515), and proceeds to step S516. Then, the lens controller 160 stores the received identification data in the lens memory 150 (step S516). At this time, the lens controller 160 acquires from the lens memory 150 the storage position data (the storage position data is abbreviated as SP data in the figure) indicating the order number of the position in the identification data storage area of the lens memory 150, at which position the received identification data is stored, and proceeds to step S517.

In step S517, the lens controller 160 sends the storage position data acquired in step S516 to the camera side, and proceeds to step S518.

Returning to the side of the camera 200 once again, the camera controller 250 receives the storage position data sent from the lens apparatus side (step S508), and proceeds to step S509.

Then, in step S509, the camera controller 250 associates the new identification data generated in step S506 with the storage position data received from the lens apparatus side in step S508 and stores the new identification data and the storage position data in the camera memory 230. At this time, the camera controller 250 also associates the back focus adjustment data with the new identification data and the storage position data, and stores the back focus adjustment data in the camera memory 230.

Here, in the case where the new identification data is generated, the camera controller 250, in step S508, enters an operation mode for obtaining the back focus adjustment data to calculate it by using the processing section 220. Then, the camera controller 250 associates the back focus adjustment data obtained in the operation mode with the new identification data and the storage position data to store them in the camera memory 230.

When storing of all the data is completed, the camera controller 250 proceeds to step S510.

The camera controller 250 sends the back focus adjustment data to the lens apparatus side (step S510), and ends its processing about the identification data at the time when the lens apparatus is mounted.

On the other hand, the lens controller 160 receives the back focus adjustment data sent from the camera controller 250 (step S518), and ends its processing about the identification data at the time when the lens apparatus is mounted. The lens controller 160 corrects the control signal for the focus lens 116 by using the back focus adjustment data acquired in step S518. That is, a back focus adjustment operation is performed.

Figure 4:
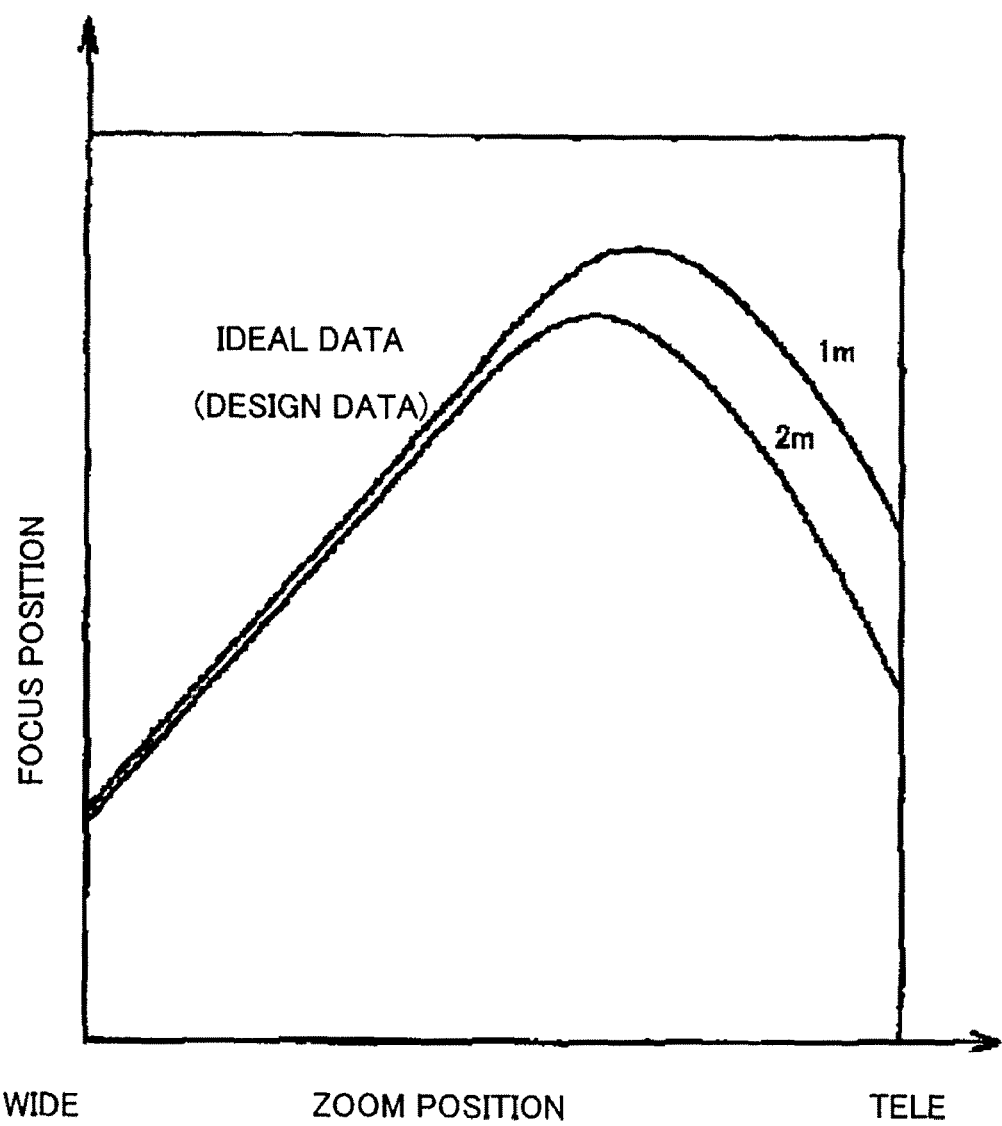
FIG. 4 shows a graph showing cam data stored in the memory shown in FIG. 1.

FIG. 4 shows cam data representing the in-focus position of the focus lens 116 with respect to the position of the magnification varying lens 112.

The lens controller 160 drives the magnification varying lens 112 via the first motor 121. At the same time, the lens controller 160 sends a signal to the third motor 123 on the basis of the above described cam data, so as to move the focus lens 116. Thereby, a magnification varying operation without focus variation can be performed.

Meanwhile, as in the case of the present embodiment, in the lens apparatus of the type in which the focus lens 116 is provided at the rear of the magnification varying lens 112, the control position of the focus lens 116 for performing magnification varying while maintaining an in-focus state, is changed in accordance with an object distance. The cam data shown in FIG. 4 represent the in-focus positions of the focus lens 116 corresponding to the object distances (for example, 1 m and 2 m), for each position of the magnification varying lens 112.

In addition, it is necessary to determine the origin for securing the accurate back focus in the position control of the focus lens 116 based on the cam data. The origin is determined by performing correction based on the above described back focus adjustment data by using a set initial position (reference position) as a reference.

The lens controller 160 performs calculation for correcting the cam data shown in FIG. 4 stored as ideal data (design data). When the back focus adjustment data sent from the camera side is positive, the back focus is longer than the ideal value. For this reason, in FIG. 4, the cam data are parallel shifted downward from the ideal cam data by subtracting the value of the back focus adjustment data from the ideal cam data.

On the other hand, when the back focus adjustment data is negative, the back focus is shorter than the ideal value. For this reason, in FIG. 4, the cam data are parallel shifted upward from the ideal cam data by adding the value of the back focus adjustment data to the ideal cam data.

Thus, it is possible to perform the magnification varying in the in-focus state by controlling the movement of the focus lens 116 with respect to the positional change of the variable magnification lens 112 on the basis of the shifted cam data.

Note that in the camera 200 according to the present embodiment, a random number generator is used as the generator 260 which generates the identification data, but a code generator may also be used as a more advanced and safe identification data generator.

Further, in the camera according to the present embodiment, the correction control using the identification data and relating to the combination of the lens apparatus 100 and the camera 200, is explained by taking the back focus adjustment as an example. However, in the case where the image-pickup element is provided with a color filter, the spectral characteristics of light entering the image-pickup element 210 are different for each combination of the lens apparatus 100 and the camera 200. Such difference is caused by the combination of variation of the ND filter 114 or coating of lens elements, and variation of the color filter of the image-pickup element 210. Thus, by storing in the camera memory 230 the correction data obtained from the spectral characteristics, which data serves as a reference corresponding to the identification data, it is also possible to perform the correction of white balance control in accordance with the combination of the lens apparatus 100 and the camera 200 which can be distinguished by the identification data.

In the digital video camera system according to the present embodiment, when the lens apparatus 100 is mounted on the camera 200, the camera 200 communicates with the lens apparatus 100 to acquire the identification data stored in the lens memory 150 and compares the acquired identification data with the identification data stored in the camera memory 230. When determining that the lens apparatus 100 and the camera 200 are newly combined, on the basis of the comparison result, the camera 200 automatically generates identification data by using the identification data generator, such as the random number generator provided for the camera 200 (however, the generator may generate the identification data in response to a switch operation by an operator for indicating the start of the generation).

This enables to provide the identification data for discriminating the combination without the need for an operator to input the identification data from outside in advance or later. Thereby, the configuration for identifying one-to-one relation between the lens apparatus and the camera can be achieved at low cost.

As a result, it is possible to provide a camera system which is capable not only of performing the back focus adjustment for each combination of the camera and the lens apparatus, but also of suppressing the increase in production cost.

Furthermore, the present invention is not limited to these preferred embodiments and various variations and modifications may be made without departing from the scope of the present invention.

This application claims foreign priority benefits based on Japanese Patent Applications Nos. 2006-030655, filed on Feb. 8, 2006, and 2007-026214, filed on Feb. 6, 2007 each of which is hereby incorporated by reference herein in its entirety as if fully set forth herein.

What is claimed is:

1. An image-pickup system which includes an image-pickup apparatus and a lens apparatus that is removably mounted on the image-pickup apparatus, comprising:
a first memory which is provided in the image-pickup apparatus and stores first identification information unique to a combination of the image-pickup apparatus and a certain lens apparatus;
a second memory which is provided in the lens apparatus and stores second identification information unique to a combination of the lens apparatus and a certain image-pickup apparatus; and
a comparator, a generator, and a controller, which are provided in one of the image-pickup apparatus and the lens apparatus,
wherein the comparator compares the first identification information stored in the first memory with the second identification information stored in the second memory,
wherein, when the comparison by the comparator results that the first identification information does not match the second identification information, the generator generates a random number as identification information unique to the combination of the image-pickup apparatus and the lens apparatus, and
wherein the controller causes the first memory and the second memory to store the random number generated by the generator as the first identification information and the second identification information, respectively.

2. An image-pickup apparatus on which a lens apparatus is removably mounted, comprising:
a memory which stores first identification information unique to a combination of the image-pickup apparatus and a certain lens apparatus;
a comparator which compares the first identification information with second identification information obtained from the lens apparatus mounted on the image-pickup apparatus, the second identification information being unique to the combination of the lens apparatus and a certain image-pickup apparatus; and
a controller and a generator operatively connected to the memory and the comparator,
wherein, when the comparison by the comparator results that the first identification information does not match the second identification information, the generator generates a random number as identification information unique to the combination of the image-pickup apparatus and the lens apparatus, and
wherein the controller causes the memory to store the random number generated by the generator as the first identification information and outputs the generated random number as the second identification information to the lens apparatus.

3. The image-pickup apparatus according to claim 2, wherein the generator includes a circuit that generates one of the random number and a code.

4. The image-pickup apparatus according to claim 2, wherein
the memory further stores back focus correction information corresponding to the combination of the image-pickup apparatus and the lens apparatus, and
the controller further outputs the back focus correction information to the lens apparatus.

5. The image-pickup apparatus according to claim 4, wherein the image-pickup apparatus includes a processor which generates the back focus correction information when the comparison by the comparator results that the first identification information does not match the second identification information.

6. A lens apparatus removably mounted on an image-pickup apparatus, the image-pickup apparatus having first identification information unique to a combination of the image-pickup apparatus and a certain lens apparatus, the lens apparatus comprising:
a memory which stores second identification information unique to a combination of the lens apparatus and a certain image-pickup apparatus;
a comparator which compares the second identification information stored in the memory with the first identification information obtained from the image-pickup apparatus; and
a controller operatively connected to the memory and the comparator,
wherein, when the comparison by the comparator results that the second identification information does not match the first identification information, a generator generates a random number as identification information unique to the combination of the lens apparatus and the image-pickup apparatus, and wherein the controller receives the generated random number as the first identification information from the image-pickup apparatus and causes the memory to store the random number as the second identification information.

7. The lens apparatus according to claim 6, wherein the generator includes a circuit to generate one of the random number and a code.

8. The lens apparatus according to claim 6, wherein
the memory further stores back focus correction information corresponding to the combination of the image-pickup apparatus and the lens apparatus, and
the controller performs a back focus correction operation based on the back focus correction information.

* * * * *